US008615675B2

(12) United States Patent
Seki et al.

(10) Patent No.: US 8,615,675 B2
(45) Date of Patent: Dec. 24, 2013

(54) IMAGE FORMING APPARATUS

(75) Inventors: Hirotaka Seki, Tokyo (JP); Atsushi Otani, Moriya (JP); Shoji Takeda, Tokyo (JP); Satoru Yamamoto, Abiko (JP); Keita Takahashi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 719 days.

(21) Appl. No.: 12/852,118

(22) Filed: Aug. 6, 2010

(65) Prior Publication Data

US 2011/0047403 A1 Feb. 24, 2011

(30) Foreign Application Priority Data

Aug. 20, 2009 (JP) ................................. 2009-191471
Jul. 22, 2010 (JP) ................................. 2010-165347

(51) Int. Cl.
*G06F 1/04* (2006.01)

(52) U.S. Cl.
USPC .......................................................... 713/503

(58) Field of Classification Search
USPC ........... 713/375, 400, 500–503; 358/409–424
See application file for complete search history.

(56) References Cited

U.S. PATENT DOCUMENTS

| | | | | |
|---|---|---|---|---|
| 3,501,236 | A * | 3/1970 | Maloney et al. | 399/8 |
| 3,761,884 | A * | 9/1973 | Avsan et al. | 713/375 |
| 3,810,119 | A * | 5/1974 | Zieve et al. | 713/375 |
| 4,392,196 | A * | 7/1983 | Glenn et al. | 713/375 |
| 4,737,907 | A * | 4/1988 | Federico et al. | 713/375 |
| 4,998,213 | A * | 3/1991 | Suzuki et al. | 358/1.13 |
| 5,041,966 | A * | 8/1991 | Nakai et al. | 713/375 |
| 5,193,175 | A * | 3/1993 | Cutts et al. | 714/11 |
| 5,384,906 | A * | 1/1995 | Horst | 713/375 |
| 5,528,347 | A * | 6/1996 | Kamath et al. | 399/18 |
| 5,704,030 | A * | 12/1997 | Kanzaki | 714/12 |
| 5,721,621 | A | 2/1998 | Komaki et al. | |
| 6,173,952 | B1 * | 1/2001 | Richards et al. | 271/228 |
| 6,199,169 | B1 * | 3/2001 | Voth | 713/400 |
| 6,229,622 | B1 | 5/2001 | Takeda | |
| 6,535,926 | B1 * | 3/2003 | Esker | 709/248 |
| 6,580,460 | B1 | 6/2003 | Takahashi et al. | |
| 6,625,498 | B1 * | 9/2003 | Kurakake et al. | 700/3 |

(Continued)

FOREIGN PATENT DOCUMENTS

| | | |
|---|---|---|
| JP | 2006-256275 A | 9/2006 |
| JP | 2009-066972 A | 4/2009 |
| JP | 2009-154376 A | 7/2009 |

OTHER PUBLICATIONS

Gusella et al, "An Election Algorithm for a Distributed Clock Synchronization Program", Dec. 1985.*

(Continued)

*Primary Examiner* — Paul R Myers
(74) *Attorney, Agent, or Firm* — Fitzpatrick, Cella, Harper & Scinto

(57) ABSTRACT

This invention provides an image forming apparatus that suppresses a control error between CPUs when the CPUs operate in cooperation with each other in distributed control by the CPUs. To accomplish this, the image forming apparatus utilizes a distributed control system. Respective CPUs measure time interval concerning image formation processing using their built-in clock oscillators, and perform operations in cooperation with each other. Correction coefficients are calculated based on the time interval measured by the respective CPUs to correct a measurement error generated by the operation an error of the respective clock oscillators. Clock count values each indicating a timing to drive a load is corrected based on the correction coefficients.

6 Claims, 11 Drawing Sheets

(56) References Cited

U.S. PATENT DOCUMENTS

| | | | | |
|---|---|---|---|---|
| 6,651,980 | B2 * | 11/2003 | Isemura et al. | 271/259 |
| 6,862,427 | B2 * | 3/2005 | Sato et al. | 399/394 |
| 6,867,879 | B1 | 3/2005 | Sasaki et al. | |
| 6,950,956 | B2 * | 9/2005 | Zerbe et al. | 713/400 |
| 7,463,388 | B2 * | 12/2008 | Tomiyasu et al. | 358/3.24 |
| 7,921,317 | B2 * | 4/2011 | Malek | 713/375 |
| 2007/0086037 | A1 | 4/2007 | Kitahara et al. | |
| 2009/0073202 | A1 | 3/2009 | Kanda et al. | |
| 2009/0174741 | A1 | 7/2009 | Nagata et al. | |
| 2009/0317096 | A1 * | 12/2009 | Odaira | 399/21 |

OTHER PUBLICATIONS

Communication (Extended European Search Report)—Appln. 10008237.9-2304, European Patent Office, dated Jan. 25, 2011.

* cited by examiner

IMAGE FORMING APPARATUS

BACKGROUND OF THE INVENTION

1. Field of the Invention

The present invention relates to an image forming apparatus implemented by a distributed control system including a plurality of CPU groups having a hierarchical structure.

2. Description of the Related Art

Centralized control using one CPU is performed for printer device control of an image forming apparatus using an electrophotographic system. An increase in CPU load due to centralized control requires a higher performance CPU. In addition, as the control load of the printer device rises, communication cables (a bundle of communication lines) need to be laid from a CPU board to distant load driver units and many long communication cables are needed. To solve these problems, a control form is receiving a great deal of attention, in which control modules which build an electrophotographic system are assigned to sub-CPUs (see Japanese Patent Laid-Open No. 2006-256275).

To apply a system configuration to perform distributed control to an image forming apparatus, and decrease the number of development processes and the cost, it is effective to adopt the same CPU circuit board arrangement, and control CPU circuit boards and loads in accordance with loads connected to the CPU circuit boards. Such CPU circuit boards can be developed to a plurality of products by increasing/decreasing the number of CPU circuit boards used. In this way, demand has arisen for development into a plurality of products having different product specifications while decreasing the number of development processes and the cost. In a system in which a plurality of CPUs perform distributed control, it is indispensable to decrease the number of components on the CPU circuit board and reduce the cost. The cost can be reduced using, for example, a clock oscillator incorporated in each CPU.

However, clock oscillators incorporated in CPUs have poor accuracy and a large individual difference. Even when external clock oscillators are used, medium- and long-term errors occur owing to their individual differences. When a plurality of CPUs individually control actuators such as stepping motors, the errors of the built-in clock oscillators or external clock oscillators lead to an error in speed between the stepping motors which control paper conveyance, pulling or flexing paper. Even when a predetermined time is measured, the time measurement results of the respective CPUs differ from each other, generating a paper jam, color misregistration, or the like.

SUMMARY OF THE INVENTION

The present invention enables realization of an image forming apparatus which suppresses a control error between CPUs when the CPUs operate in cooperation with each other in distributed control using a plurality of CPUs.

One aspect of the present invention provides an image forming apparatus comprising: an upper layer control unit that controls a function for forming an image on a printing material; and a first lower layer control unit and a second lower layer control unit that are controlled by the upper layer control unit and control loads for implementing the function, the first lower layer control unit and the second lower layer control unit respectively comprising: a clock oscillator; a measurement unit that measures a predetermined time interval by using the clock oscillator; and a notifying unit that notifies the upper layer control unit of the time interval, the first lower layer control unit further comprising a correction unit that acquires a correction coefficient from the upper layer control unit to correct an error between the clock oscillators incorporated in the first lower layer control unit and the second lower layer control unit, and corrects, based on the correction coefficient, a clock count value indicating a timing to drive the load, and the upper layer control unit comprising an obtaining unit that obtains the correction coefficient based on the time interval notified from the first lower layer control unit and the second lower layer control unit.

Another aspect of the present invention provides an image forming apparatus comprising a first control unit and second control unit that control loads for forming an image on a printing material, the first control unit comprising: a clock oscillator; a measurement unit that measures a predetermined time interval by using the clock oscillator; a notifying unit that notifies the second control unit of the measured time interval; and a correction unit that acquires a correction coefficient from the second control unit to correct an error of the clock oscillator, and corrects, based on the correction coefficient, a clock count value indicating a timing to drive the load, and the second control unit comprising an obtaining unit that obtains the correction coefficient based on the time interval notified from the first control unit.

Still another aspect of the present invention provides an image forming apparatus comprising a first control unit and second control unit that control loads for forming an image on a printing material, the first control unit comprising: a clock oscillator; a measurement unit that measures a predetermined time interval by using the clock oscillator; and a notifying unit that notifies the second control unit of the measured time interval, and the second control unit comprising: an obtaining unit that obtains the correction coefficient to correct an error of the clock oscillator based on the time interval notified from the first control unit; and a correction unit that corrects, based on the correction coefficient obtained by the obtaining unit, a clock count value indicating a timing to drive the load.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Arrangement of Image Forming Apparatus>

Figure 1:
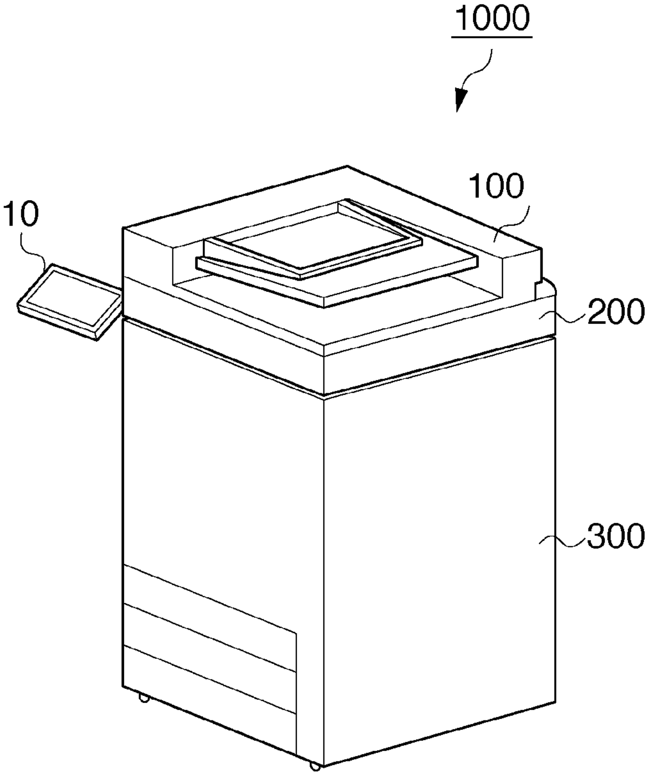
FIG. 1 is a view showing the outer appearance of an image forming apparatus 1000 according to the present invention.

The arrangement of an image forming apparatus according to the present invention will be described with reference to FIG. 1. As shown in FIG. 1, an image forming apparatus 1000 includes an automatic document feeder (ADF) 100, image reading unit 200, image forming unit 300, and operation unit 10. The image reading unit 200 is mounted on the image forming unit 300. The automatic document feeder 100 is mounted on the image reading unit 200. The image forming apparatus 1000 implements distributed control using a plurality of control units (CPUs).

The automatic document feeder 100 automatically conveys a document onto a document glass. The image reading unit 200 reads the document conveyed from the automatic document feeder 100, outputting image data. The image forming unit 300 forms an image on a printing material based on image data output from the automatic document feeder 100 or image data input from an external apparatus connected via a network. The operation unit 10 provides a GUI (Graphical User Interface) which allows the user to perform various kinds of operations. The operation unit 10 includes a display unit such as a touch panel and can present information to the user.

<Image Forming Unit>

Details of the image forming unit 300 will be described with reference to FIG. 2. The image forming unit 300 according to the embodiment employs an electrophotographic system. Note that letters Y, M, C, and K as the suffices of reference numerals in FIG. 2 indicate respective engines corresponding to yellow, magenta, cyan, and black toners. In the following description, an engine corresponding to all types of toner will be denoted by a reference numeral without any of the letters Y, M, C, and K as suffixes. Individual engines will be denoted by reference numerals with the letters Y, M, C, and K as suffixes.

A photosensitive drum (to be simply referred to as a "photosensitive member") 225 serving as an image carrier for forming a full-color electrostatic image is provided to be rotated by a motor in the direction indicated by arrow A. The photosensitive member 225 is surrounded by a primary charger 221, exposure unit 218, developing unit 223, transfer unit 220, cleaner unit 222, and charge remover 271.

A developing unit 223K is used for monochromatic development, and develops a latent image on a photosensitive member 225K with K toner. Developing units 223Y, 223M, and 223C are used for full-color development, and develop latent images on photosensitive members 225Y, 225M, and 225C with Y, M, and C toners, respectively. The transfer unit 220 simultaneously transfers toner images developed in the respective colors on the photosensitive members 225 onto a transfer belt 226 serving as an intermediate transfer member. As a result, the toner images of the four colors are superimposed.

The transfer belt 226 is looped around rollers 227, 228, and 229. The roller 227 functions as a driving roller which is coupled to a driving source to drive the transfer belt 226. The roller 228 functions as a tension roller to adjust the tension of the transfer belt 226. The roller 229 functions as a backup roller for a transfer roller serving as a secondary transfer unit 231. A transfer roller attaching/detaching unit 250 is a driving unit for bringing the secondary transfer unit 231 into contact with or separating it apart from the transfer belt 226. A cleaner blade 232 is provided below the transfer belt 226 after a position where the belt passes through the secondary transfer unit 231. The blade scrapes off residual toner from the transfer belt 226.

A registration roller 255, a paper feed roller pair 235, and vertical path roller pairs 236 and 237 feed printing materials (printing sheets) stored in cassettes 240 and 241 and a manual paper feed unit 253 to a nip portion which is a contact portion between the secondary transfer unit 231 and the transfer belt 226. At this time, the transfer roller attaching/detaching unit 250 brings the secondary transfer unit 231 into contact with the transfer belt 226. A toner image formed on the transfer belt 226 is transferred onto a printing material at the nip portion. A fixing unit 234 thermally fixes the toner image transferred on the printing material. The printing material is then delivered outside the apparatus.

The cassettes 240 and 241 and the manual paper feed unit 253 respectively include sheet absence sensors 243, 244, and 245 for detecting the presence/absence of a printing material. Also, the cassettes 240 and 241 and the manual paper feed unit 253 respectively include paper feed sensors 247, 248, and 249 for detecting a printing material pickup failure.

An image forming operation by the image forming unit 300 will be described below. After the start of image formation, pickup rollers 238, 239, and 254 convey printing materials stored in the cassettes 240 and 241 and the manual paper feed unit 253 one by one to the paper feed roller pair 235. When the paper feed roller pair 235 conveys the printing material to the registration roller 255, a registration sensor 256 located immediately before the registration roller 255 detects the passage of the printing material.

When the registration sensor 256 detects the passage of the printing material, the conveyance operation is temporarily interrupted after the lapse of a predetermined period of time in the embodiment. The printing material comes into contact with the registration roller 255 at rest, and the conveyance operation stops. At this time, the conveyance position is so fixed as to make the leading end of the printing material perpendicular to the conveyance path, correcting a skew of the printing material, that is, the state in which the conveyance direction of the printing material shifts from the conveyance path. This processing will be called position correction. The position correction is necessary to minimize subsequent inclination of the image forming direction relative to the printing material. After the position correction, the registration roller 255 is activated to supply the printing material to the secondary transfer unit 231. The registration roller 255 is coupled to a driving source and driven to rotate upon receiving a driving force via a clutch.

A voltage is applied to the primary charger 221 to negatively charge the surface of the photosensitive member 225 uniformly to a predetermined charge potential. The exposure unit 218 including a laser scanner unit exposes an image portion on the charged photosensitive member 225 to set the image portion at a predetermined exposure potential, thereby forming a latent image. The exposure unit 218 forms a latent image corresponding to an image by emitting or stopping a laser beam based on image data sent from a controller 460 via a printer control I/F 215.

A developing bias set in advance for each color is applied to the developing roller of the developing unit 223. The latent image is developed with toner and visualized as a toner image when passing through the developing roller position. The transfer unit 220 transfers the toner image onto the transfer belt 226. The secondary transfer unit 231 then transfers the image onto the printing material conveyed by the paper feed unit. The printing material passes through a post-registration conveyance path 268, and is conveyed to the fixing unit 234 via a fixing conveyance belt 230.

In the fixing unit 234, first of all, pre-fixing chargers 251 and 252 charge the printing material to prevent image disturbance by compensating for the attraction power of toner, and fixing rollers 233 thermally fix the toner image. After that, a delivery flapper 257 switches the conveyance path to a delivery path 258, and delivery rollers 270 deliver the printing material onto a delivery tray 242.

The cleaner unit 222 removes and recovers residual toner from the photosensitive member 225. Finally, the charge remover 271 uniformly removes charges from the photosensitive member 225 to almost 0 V in preparation for the next image formation cycle.

The color image formation start timing of the image forming apparatus 1000 can be set so that an image is formed at an arbitrary position on the transfer belt 226 because Y, M, C, and K toner images are transferred at the same time. However, the image formation start timing needs to be determined while shifting the timing to cancel misregistration of positions where toner images are transferred on the photosensitive members 225Y, 225M, and 225C.

In the image forming unit 300, printing materials can be successively fed from the cassettes 240 and 241 and the manual paper feed unit 253. In this case, printing materials are fed from the cassettes 240 and 241 and the manual paper feed unit 253 at the shortest interval by taking account of the sheet length of a preceding printing material so that printing materials do not overlap each other. As described above, the registration roller 255 is activated after position correction and supplies a printing material to the secondary transfer unit 231. When the printing material reaches the secondary transfer unit 231, the registration roller 255 is temporarily stopped again in order to correct the position of a succeeding printing material similarly to the preceding printing material.

An operation to form an image on the reverse surface of a printing material will be described in detail. When forming an image on the reverse surface of a printing material, an image is first formed on its obverse surface. If an image is formed on only the obverse surface, the fixing unit 234 thermally fixes the toner image, and the printing material is directly delivered to the delivery tray 242. When an image is to be formed on the reverse surface successively, the delivery flapper 257 switches the conveyance path to a reverse surface path 259 upon detecting the printing material by a sensor 269. In synchronism with this, reverse rollers 260 are driven to rotate and convey the printing material to a surface reverse path 261. After the printing material passes through the surface reverse path 261 by a distance corresponding to the width in the paper feed direction, the reverse rollers 260 are driven to rotate reversely and switch the traveling direction of the printing material. With the image-bearing obverse surface facing down, double-sided printing path conveyance rollers 262 are driven to convey the printing material to a double-sided printing path 263.

The printing material is then conveyed to paper re-feed rollers 264 along the double-sided printing path 263, and a paper re-feed sensor 265 located immediately before the paper re-feed rollers 264 detects the passage of the printing material. When the paper re-feed sensor 265 detects the passage of the printing material, the conveyance operation is temporarily interrupted after the lapse of a predetermined period of time in the embodiment. The printing material comes into contact with the paper re-feed rollers 264 at rest, and the conveyance operation temporarily stops. At this time, the position of the printing material is so fixed as to make the leading end of the printing material perpendicular to the conveyance path, correcting a skew of the printing material, that is, the state in which the conveyance direction of the printing material shifts from the conveyance path in the paper re-feed path. This processing will be called position recorrection.

The position recorrection is necessary to minimize subsequent inclination of the image forming direction relative to the reverse surface of the printing material. After the position recorrection, the paper re-feed rollers 264 are activated to convey the printing material again along a paper feed path 266 with the obverse and reverse surfaces being reversed. A subsequent image forming operation is the same as the above-described one for the obverse surface, so a description thereof will not be repeated. The delivery flapper 257 switches the conveyance path to the delivery path 258. The printing material bearing images on its obverse and reverse surfaces is delivered to the delivery tray 242.

Note that the image forming unit 300 can successively feed printing materials even in double-sided printing as well. However, the image forming unit 300 includes only one system for forming an image on a printing material, fixing a formed toner image, and the like. It is therefore impossible to simultaneously print on the obverse and reverse surfaces. In double-sided printing, the image forming unit 300 alternately forms images on printing materials fed from the cassettes 240 and 241 and the manual paper feed unit 253 and those which are reversed for reverse-surface printing and re-fed to the image forming unit.

Figure 2:
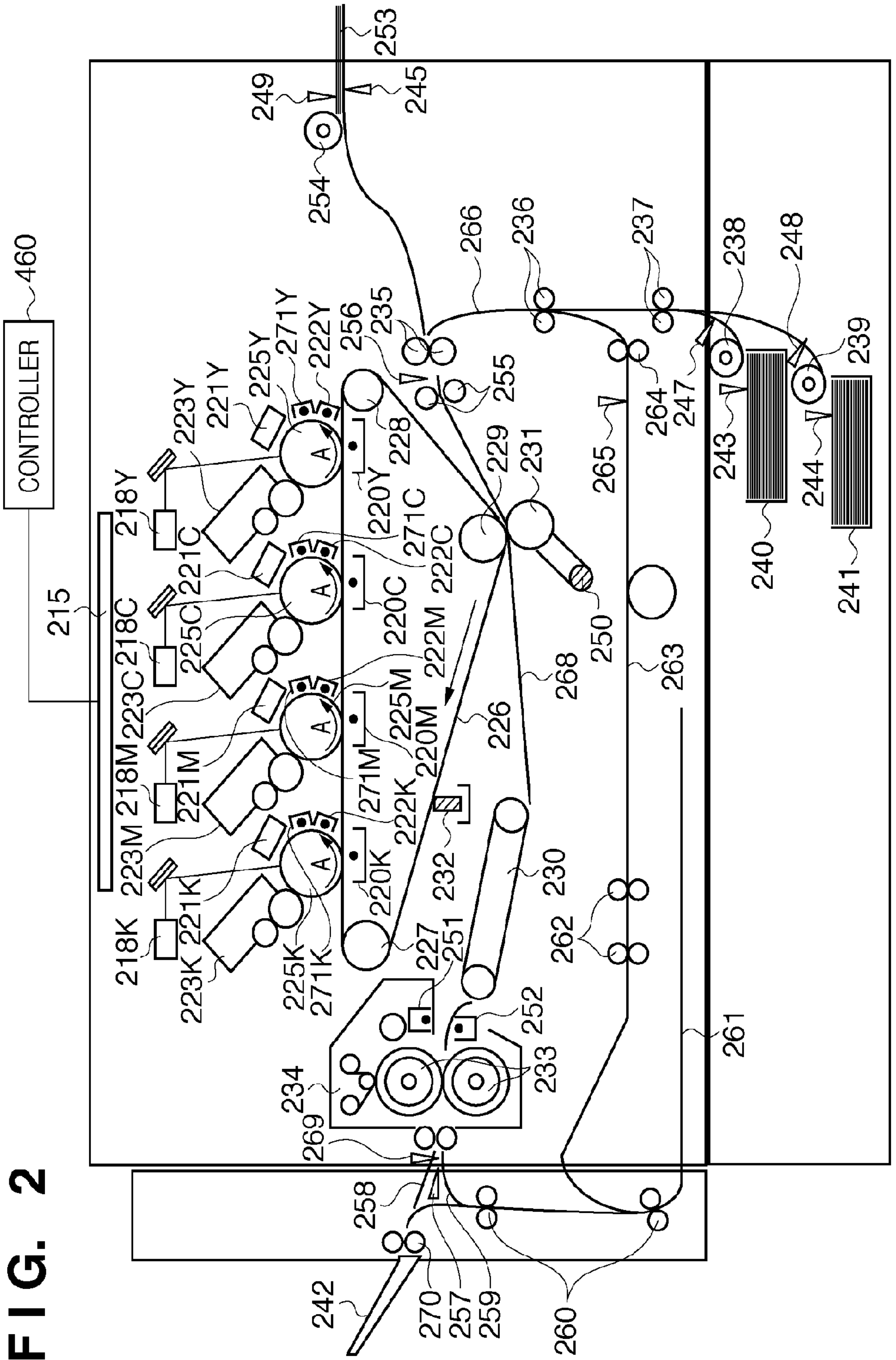
FIG. 2 is a sectional view exemplifying the arrangement of an image forming unit 300 according to the present invention.

In the image forming unit 300, the control loads shown in FIG. 2 are grouped into four control blocks, namely a conveyance module A 280, conveyance module B 281, image forming module 282, and fixing module 283 to be described later, each of which is autonomously controlled. The image forming unit 300 also includes a master module 284 for comprehensively controlling the four control blocks to make them function as an image forming apparatus. The control arrangement of each module will be explained with reference to FIG. 3.

Figure 3:
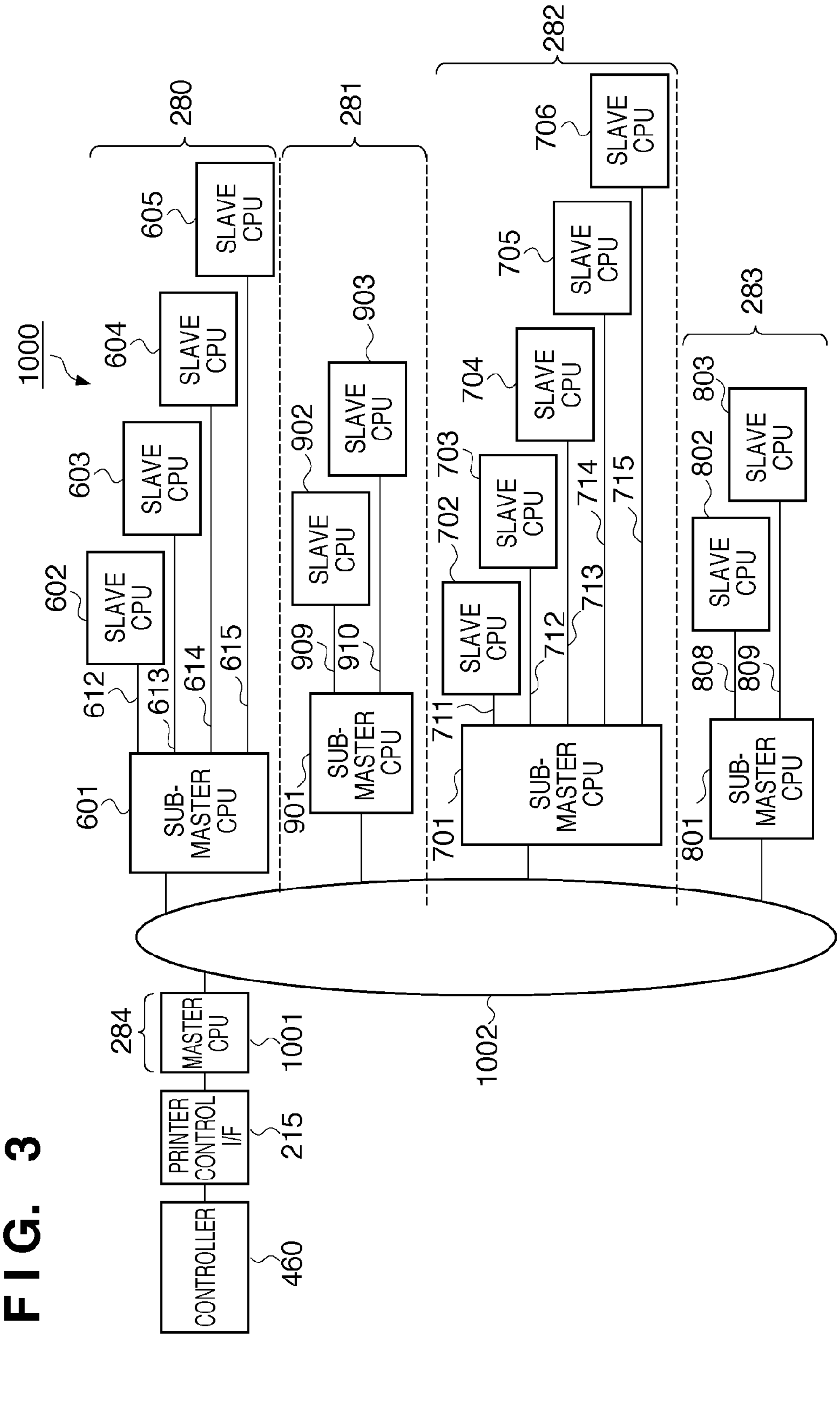
FIG. 3 is a view schematically showing the association between a master CPU, sub-master CPUs, and slave CPUs according to the present invention.

In the embodiment, as shown in FIG. 3, a master CPU (master control unit/upper layer control unit) 1001 included in the master module 284 controls the overall image forming apparatus 1000 based on instructions and image data sent from the controller 460 via the printer control I/F 215. The conveyance module A 280, conveyance module B 281, image forming module 282, and fixing module 283 for performing image formation respectively include sub-master CPUs (sub-master control units/upper layer control units) 601, 901, 701, and 801 for controlling the respective functions. The master CPU 1001 controls the sub-master CPUs 601, 901, 701, and 801. The respective functional modules include slave CPUs (slave control units/lower layer control units) 602, 603, 604, 605, 902, 903, 702, 703, 704, 705, 706, 802, and 803 for operating the control loads to perform the respective functions. The sub-master CPU 601 controls the slave CPUs 602, 603, 604, and 605. The sub-master CPU 901 controls the slave CPUs 902 and 903. The sub-master CPU 701 controls the slave CPUs 702, 703, 704, 705, and 706. The sub-master CPU 801 controls the slave CPUs 802 and 803.

As shown in FIG. 3, the master CPU 1001 is connected to the sub-master CPUs 601, 701, 801, and 901 via a common network communication bus (first signal line) 1002. The sub-master CPUs 601, 701, 801, and 901 are also connected to each other via the network communication bus (first signal line) 1002. Note that the master CPU 1001 and the sub-master CPUs 601, 701, 801, and 901 may be ring-connected to each other. The sub-master CPU 601 is further connected one-to-one (peer-to-peer connection) to the slave CPUs 602, 603, 604, and 605 via high-speed serial communication buses (second signal lines) 612, 613, 614, and 615, respectively. Similarly, the sub-master CPU 701 is connected to the slave CPUs 702, 703, 704, 705, and 706 via high-speed serial communication buses (second signal lines) 711, 712, 713, 714, and 715, respectively. The sub-master CPU 801 is connected to the slave CPUs 802 and 803 via high-speed serial communication buses (second signal lines) 808 and 809, respectively. The sub-master CPU 901 is connected to the slave CPUs 902 and 903 via high-speed serial communication buses (second signal lines) 909 and 910, respectively. The high-speed serial communication bus is used for short-distance, high-speed communication.

In the image forming apparatus 1000 according to the embodiment, functions are divided to implement control requiring timing-dependent responsiveness within functional modules comprehensively controlled by the respective sub-master CPUs. Thus, a high-speed serial communication bus with good responsiveness is used for communication between each slave CPU for driving an end control load and a corresponding sub-master CPU. That is, a signal line higher in data transfer timing accuracy than the first signal line is used as the second signal line.

On the other hand, only the rough processing sequence of the image forming operation requiring no precise control timing is controlled between the sub-master CPUs 601, 701, 801, and 901 and the master CPU 1001. For example, the master CPU 1001 instructs the sub-master CPUs to start pre-image formation processing, paper feeding, and post-image formation processing. Before the start of image formation, the master CPU 1001 issues instructions to the sub-master CPUs, based on a mode (for example, monochrome mode or double-sided image formation mode) designated by the controller 460. Also, only processes requiring no precise timing control are performed between the sub-master CPUs 601, 701, 801, and 901. That is, the control of the image forming apparatus is divided into control units which do not mutually require precise timing control. The respective sub-master CPUs control the respective control units at precise timings. The image forming apparatus 1000 can minimize the communication traffic and use the inexpensive, low-speed network communication bus 1002 for connection. Note that the master CPU, sub-master CPUs, and slave CPUs need not always be mounted on uniform control boards, and can be variably arranged in accordance with mounting in the apparatus.

<First Embodiment>

Figure 4:
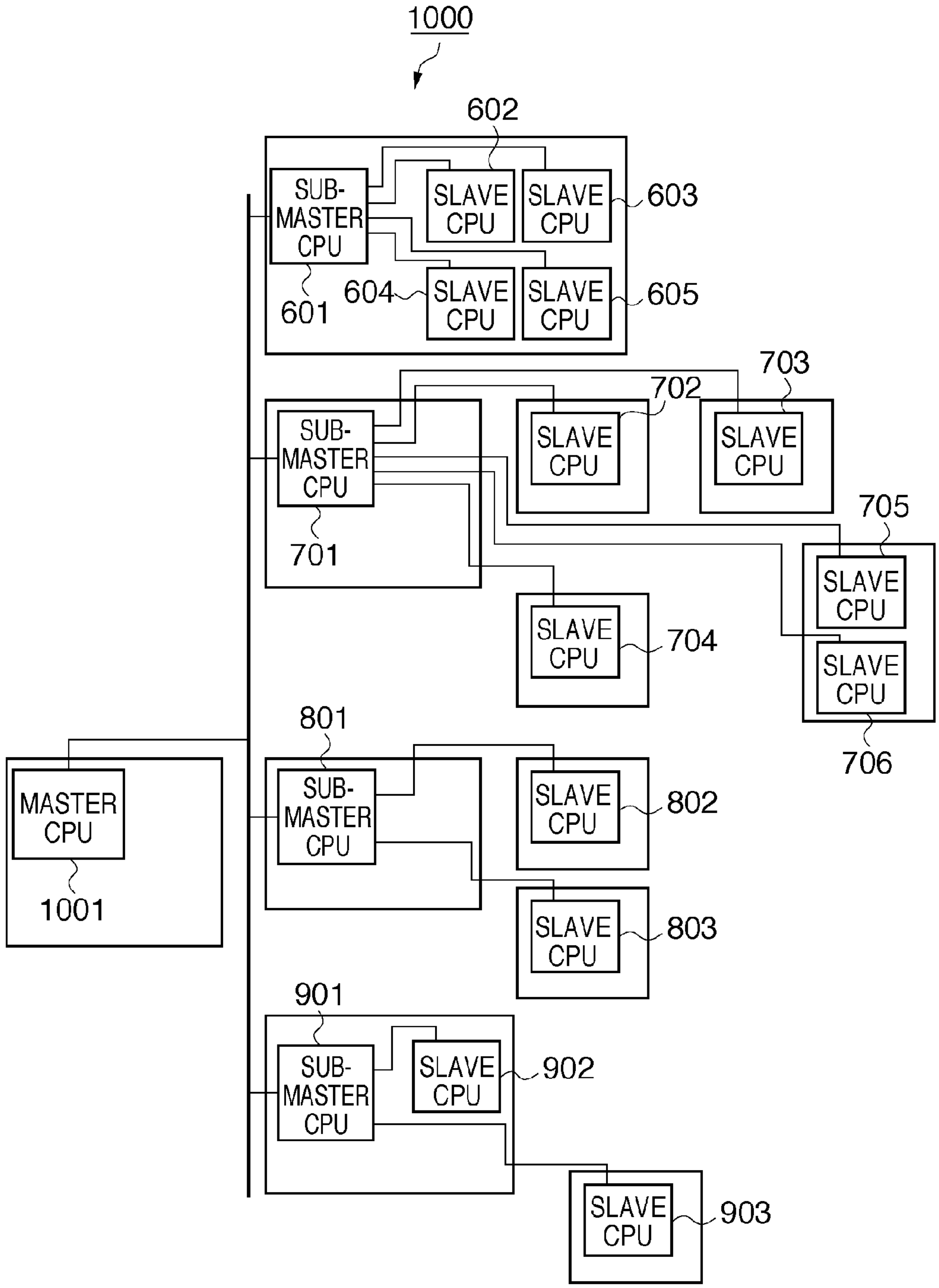
FIG. 4 is a block diagram showing an example of the control boards of the image forming apparatus 1000 according to the present invention.

The first embodiment in the present invention will be described. A sub-master CPU 601 and slave CPUs 602 and 603 shown in FIG. 4, and a paper feed sensor 247 and registration sensor 256 shown in FIG. 2 will be exemplified. A concrete arrangement of the boards of a master CPU, sub-master CPUs, slave CPUs will be exemplified with reference to FIGS. 5 and 6.

Figure 5:
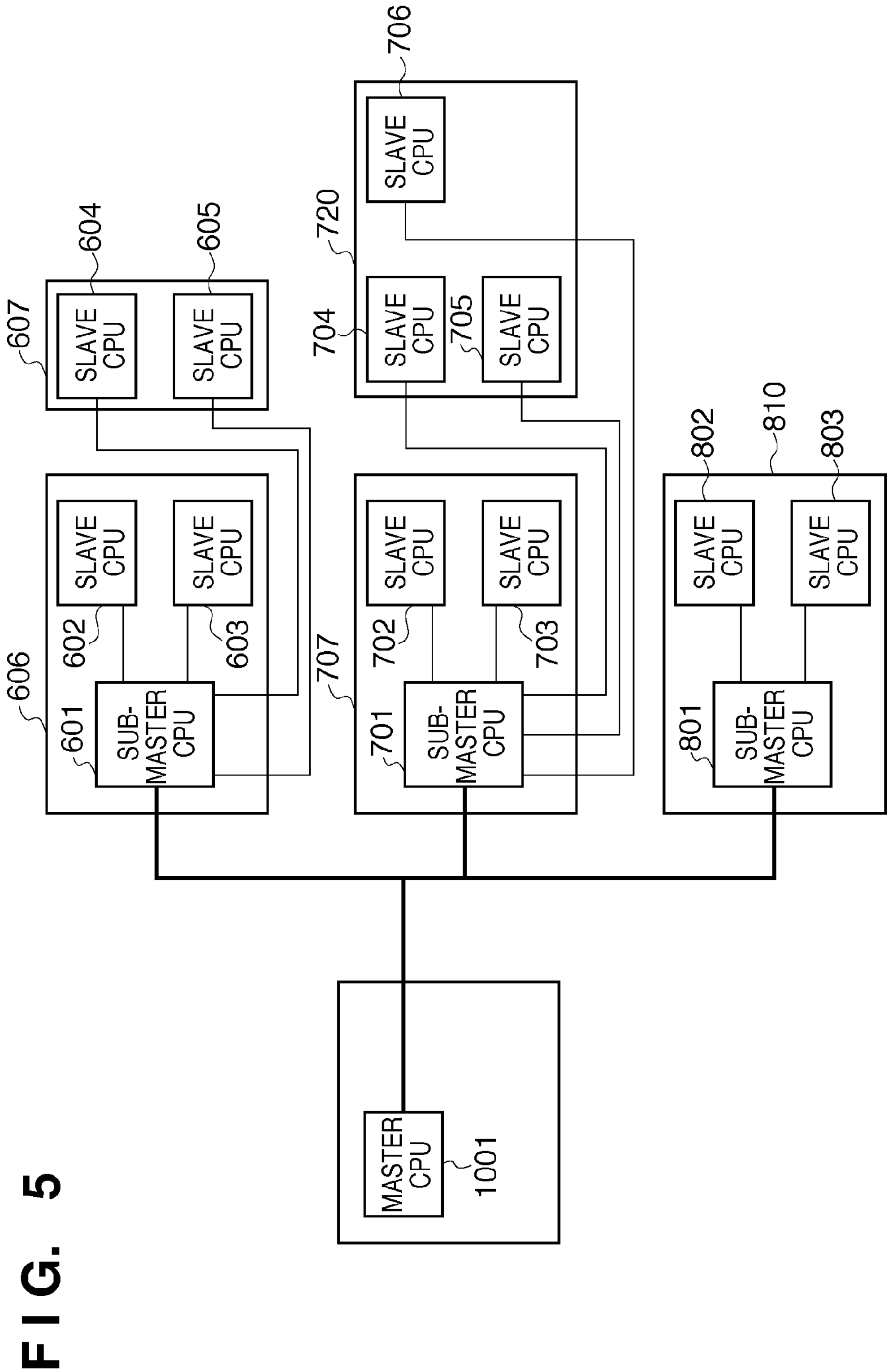
FIG. 5 is a block diagram showing an example of the control boards of an image forming apparatus 1000 according to the first embodiment.

In product A shown in FIG. 5, the sub-master CPU 601 and the slave CPUs 602 and 603 are mounted on a single circuit board 606. In product A, all the circuit board 606, and circuit boards 707 and 810 including sub-master CPUs and slave CPUs are formed from identical circuits and are different in only a program for controlling sub-master CPUs and slave CPUs. If only the circuit boards 606 and 707 cannot satisfy the performance, a circuit board 607 including slave CPUs 604 and 605, and a circuit board 720 including slave CPUs 704, 705, and 706 are added, implementing desired product specifications.

Figure 6:
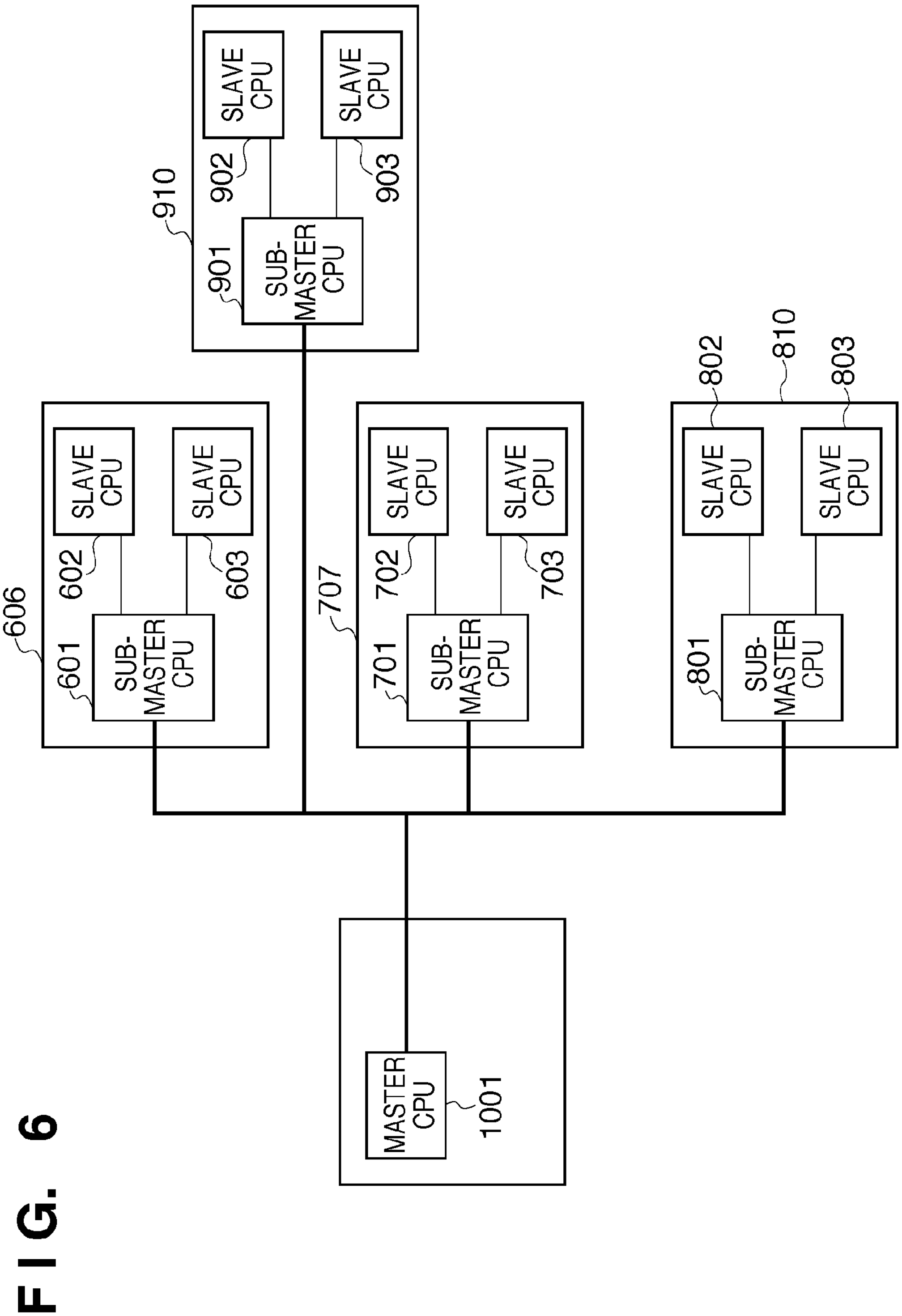
FIG. 6 is a block diagram showing another example of the control boards of the image forming apparatus 1000 according to the first embodiment.

In product B shown in FIG. 6, all the circuit boards 606, 707, and 810, and a circuit board 910 including sub-master CPUs and slave CPUs are formed from identical circuits and are different in only a program for controlling sub-master CPUs and slave CPUs. In this way, product specifications required can be easily provided by changing the number of identical mounted circuit boards including sub-master CPUs and slave CPUs, and further changing the program for controlling sub-master CPUs and slave CPUs.

Figure 7:
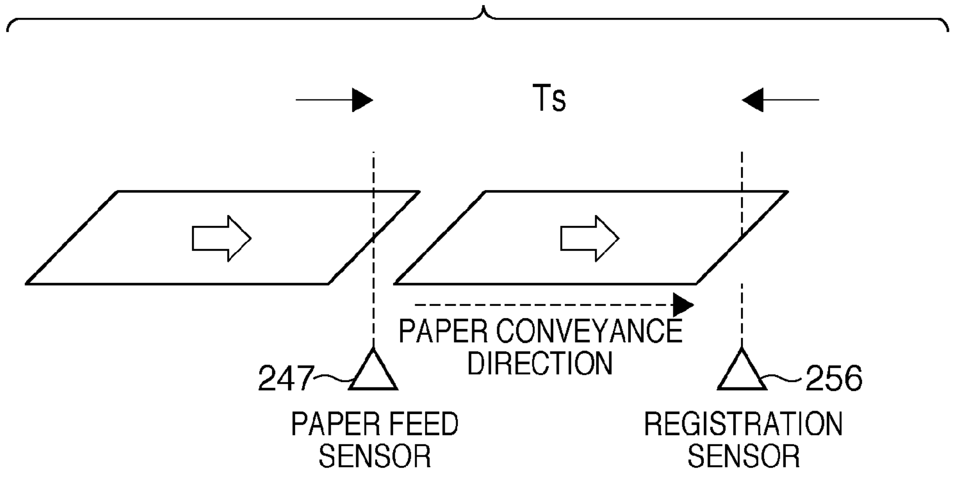
FIG. 7 is a view for explaining the time interval to be measured according to the first embodiment.

Time measurement by each CPU in the first embodiment will be explained with reference to FIG. 7. As shown in FIG. 7, the paper feed sensor 247 and registration sensor 256 are provided on a paper conveyance path (conveyance path) for conveying paper in a direction indicated by an arrow. These sensors are located physically apart from the paper conveyance path. The registration sensor 256 is provided downstream of the paper feed sensor 247 in the paper conveyance direction. Paper is conveyed along the paper conveyance path having this arrangement, and the paper feed sensor 247 first detects it. After the paper is conveyed for a time Ts, the registration sensor 256 detects it. According to the first embodiment, the time interval Ts between detection of paper by the paper feed sensor 247 and that by the registration sensor 256 is measured in image formation processing.

Figure 8:
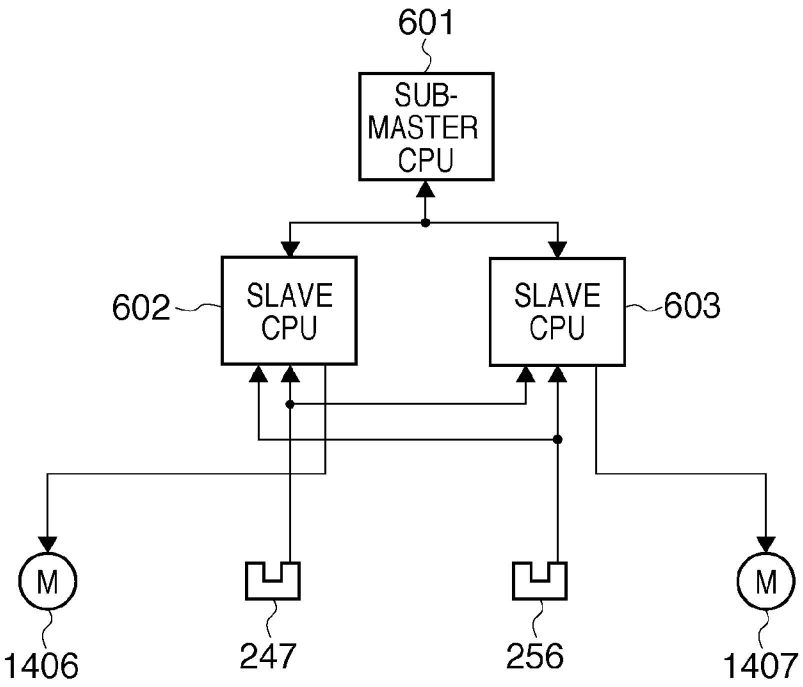
FIG. 8 is a diagram showing a control arrangement for correcting the time interval according to the first embodiment.

A detailed control arrangement according to the first embodiment will be described with reference to FIG. 8. The sub-master CPU 601 communicates with the slave CPUs 602 and 603. The connection method is arbitrarily parallel bus connection or serial bus connection. The slave CPU 602 controls the paper feed sensor 247 and an actuator 1406 such as a stepping motor. The slave CPU 603 controls the registration sensor 256 and an actuator 1407 such as a stepping motor. The paper feed sensor 247 outputs a signal to the slave CPUs 602 and 603. The registration sensor 256 outputs a signal to the slave CPUs 602 and 603. The use of clock oscillators incorporated in the slave CPUs 602 and 603 will be exemplified. However, the same arrangement is also applicable even when an external clock oscillator is used. The same arrangement is further applicable even when a master CPU replaces a sub-master CPU.

Figure 9:
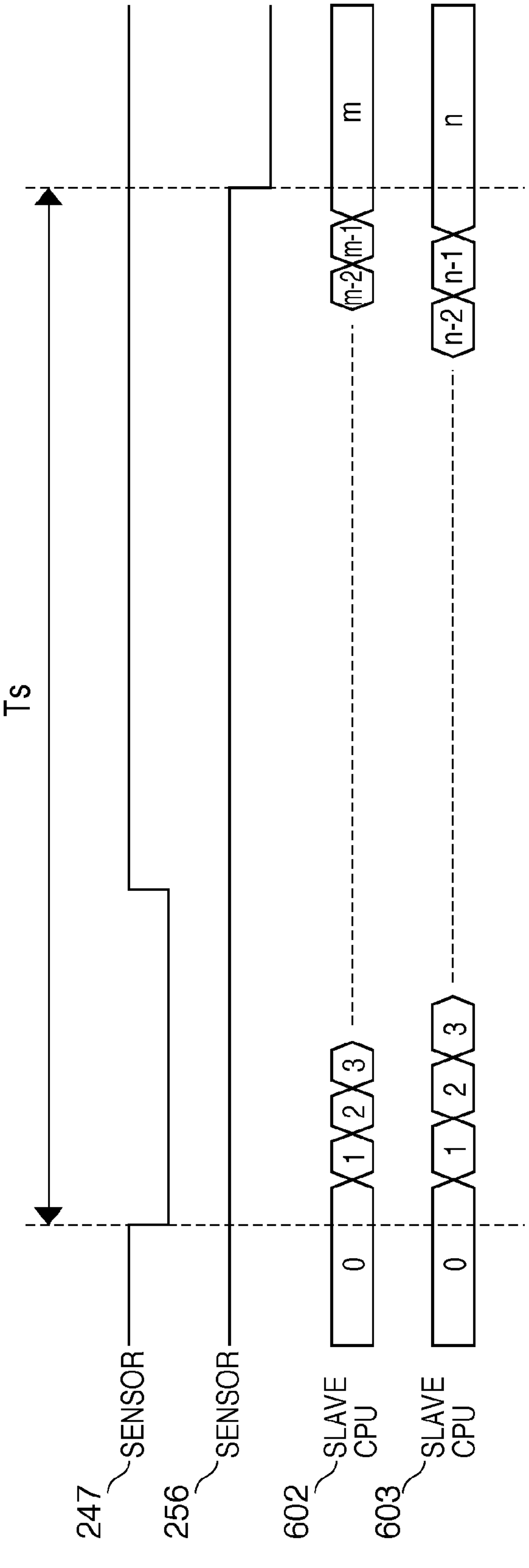
FIG. 9 is a timing chart showing operation timings according to the first embodiment.

The operation timings of the paper feed sensor 247, registration sensor 256, and slave CPUs 602 and 603 will be described with reference to FIG. 9. When the paper feed sensor 247 detects paper, the slave CPUs 602 and 603 start counting clocks, and keep counting clocks for the time Ts until the registration sensor 256 detects the paper. As shown in FIG. 9, the slave CPUs 602 and 603 use built-in clock oscillators, and the counting results are different from each other depending on variations of the accuracy of the clock oscillator. More specifically, the count by the slave CPU 602 is m, and that by the slave CPU 603 is n.

Figure 10:
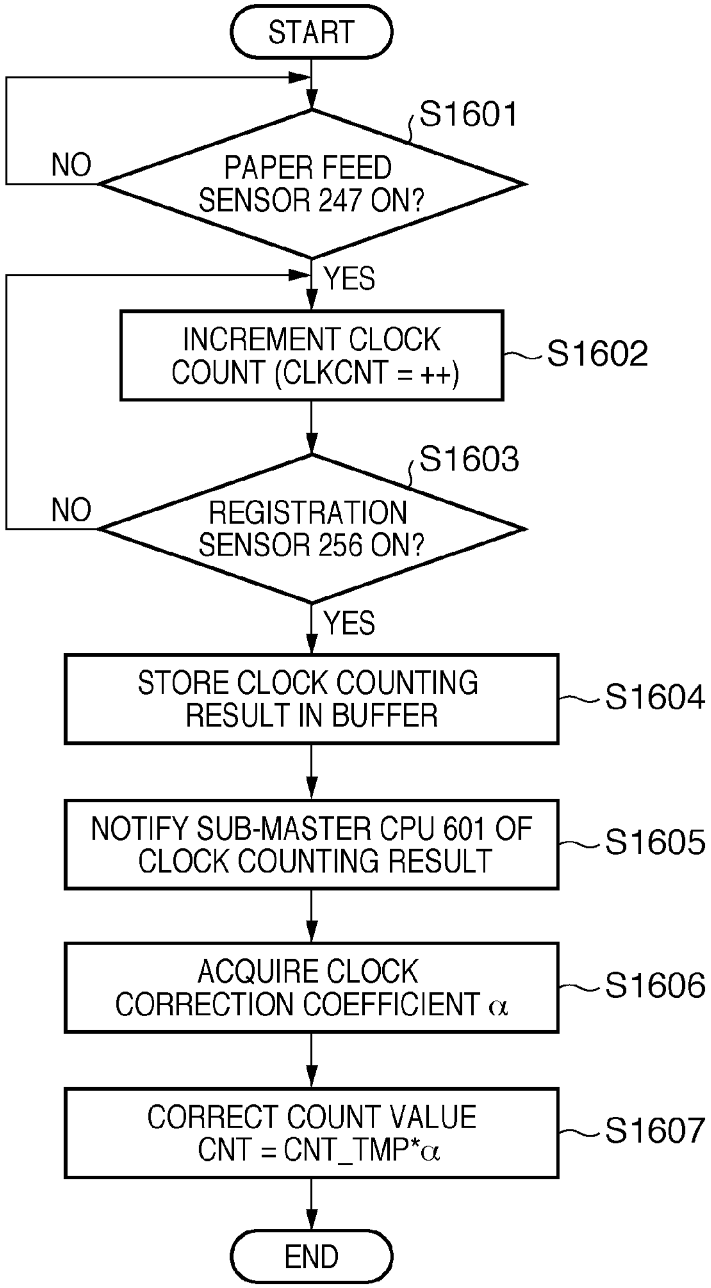
FIG. 10 is a flowchart showing a clock correction processing sequence according to the first embodiment.

Clock correction by the slave CPU 602 will be explained with reference to a flowchart shown in FIG. 10. In S1601, the slave CPU 602 determines whether paper has passed through the paper feed sensor 247. That is, the slave CPU 602 determines whether the paper feed sensor 247 has detected the leading edge of the paper. If the paper feed sensor 247 has detected the paper, the process advances to S1602; if NO, the determination in S1601 is periodically repeated.

In S1602, the slave CPU 602 counts clocks using, for example, a built-in clock oscillator. The clock count is incremented from an initial value "0". In S1603, the slave CPU 602 determines whether the leading edge of the paper has passed through the registration sensor 256. That is, the slave CPU 602 determines whether the registration sensor 256 has detected the paper. If the registration sensor 256 has detected the paper, the process advances to S1604; if NO, returns to S1602 to keep incrementing the clock count. Note that the slave CPU 602 functions as a measurement unit in S1601 to S1604.

If the registration sensor 256 has detected the paper, the slave CPU 602 stores the clock counting result in a memory such as an internal RAM in S1604. In S1605, the slave CPU 602 functions as a notifying unit to notify the sub-master CPU 601 of the clock counting result stored in S1604. In S1606, the slave CPU 602 acquires a clock correction coefficient α calculated by the sub-master CPU 601. After acquiring the clock correction coefficient α, in S1607, the slave CPU 602 functions as a correction unit and corrects a timer count value based on the clock correction coefficient α acquired from the sub-master CPU 601. The timer count value is a clock count value indicating a timing to drive a load (for example, an actuator such as a stepping motor or solenoid). The slave CPU drives the load when the clock count value of the built-in clock oscillator coincides with the timer count value. More specifically, the slave CPU 602 calculates the timer count value using a linear equation "timer count value CNT=temporary count value CNT_TMP*clock correction coefficient α", as shown in FIG. 10. The slave CPU 602 performs this correction processing for all timer count values used in image formation processing. The same processing as that of the flowchart shown in FIG. 10 is done even for clock correction by the slave CPU 603.

The correction coefficient α acquired from the sub-master CPU 601 in S1606 will be explained. As described above, in S1605, each of the slave CPUs 602 and 603 notifies the sub-master CPU 601 of a clock counter value measured until the registration sensor 256 detects paper after the paper feed sensor 247 detects it. At this time, the sub-master CPU 601 functions as an obtaining unit and obtains the clock correction coefficient α based on clock counter values notified from the two slave CPUs.

In this case, cpu0_cnt is the clock counting result of the slave CPU 602, and cpu1_cnt is that of the slave CPU 603. Also, α0 is the clock correction coefficient of the slave CPU 602, and α1 is that of the slave CPU 603. Further, cnt is a predetermined clock count value.

When the clocks of the slave CPU 603 are corrected using those of the slave CPU 602 as reference clocks (reference value), the sub-master CPU 601 calculates the clock correction coefficients α0 and α1:

$$\alpha 0=1$$

$$\alpha 1=cpu0\_cnt/cpu1\_cnt$$

Since the clocks of the slave CPU 602 serve as reference clocks, as described above, the clock correction coefficient α0 for the slave CPU 602 is 1. That is, a clock count value measured by the slave CPU 602 whose clocks are reference clocks is not corrected.

In contrast, when the clocks of the slave CPU 602 are corrected using those of the slave CPU 603 as reference clocks, the sub-master CPU 601 calculates the clock correction coefficients α0 and α1:

$$\alpha 0=cpu1\_cnt/cpu0\_cnt$$

$$\alpha 1=1$$

As described above, the clocks of the slave CPU 603 serve as reference clocks, so the clock correction coefficient α1 for the slave CPU 603 is 1. That is, a clock count value measured by the slave CPU 603 whose clocks are reference clocks is not corrected.

When a predetermined clock count value cnt is used as a reference, the sub-master CPU 601 calculates the clock correction coefficients α0 and α1:

$$\alpha 0=cnt/cpu0\_cnt$$

$$\alpha 1=cnt/cpu1\_cnt$$

As described above, the sub-master CPU 601 calculates the clock correction coefficient α used for each slave CPU. However, the present invention is not limited to the foregoing methods, and the method of calculating the clock correction coefficient is arbitrary as long as operation matching between slave CPUs is maintained. Also, the sub-master CPU 601 may notify the slave CPUs 602 and 603 of predetermined clock correction coefficients α. In this case, each clock correction coefficient needs to be set in advance in shipment from the factory or the like. One of slave CPUs may calculate a clock correction coefficient instead of a sub-master CPU. In this case, the first slave CPU measures a predetermined time interval by using the clock oscillator in the first slave CPU and notifies the second slave CPU of the time interval. Then, the second slave CPU obtains the correction coefficient based on the time interval notified from the first slave CPU. Next, the first slave CPU acquires the correction coefficient from the second slave CPU and corrects, based on the correction coefficient, a clock count value indicating a timing to drive the load. In other modification, the first slave CPU measures a predetermined time interval by using the clock oscillator in the first slave CPU and notifies the second slave CPU of the time interval. Then, the second slave CPU obtains the correction coefficient based on the time interval notified from the first slave CPU. Next, the second slave CPU corrects, based on the correction coefficient, a clock count value indicating a timing to drive the load.

As described above, the image forming apparatus according to the first embodiment utilizes a distributed control system. Respective CPUs measure time interval concerning image formation processing using their built-in clock oscillators, and perform operations in cooperation with each other. Correction coefficients are calculated based on the time interval measured by the respective CPUs to cancel a measurement error generated by the error of the respective clock oscillators. Clock count values each indicating a timing to drive a load are corrected based on the correction coefficients. The image forming apparatus can implement distributed control at low cost. In addition, the image forming apparatus can suppress a control error generated by the error of the clock oscillators incorporated in the respective CPUs, for example, a measurement error of the time interval concerning image formation processing. However, the present invention is not limited to the image forming apparatus. The present invention may be applied to other control apparatuses utilizing a distributed control system.

<Second Embodiment>

Figure 11:
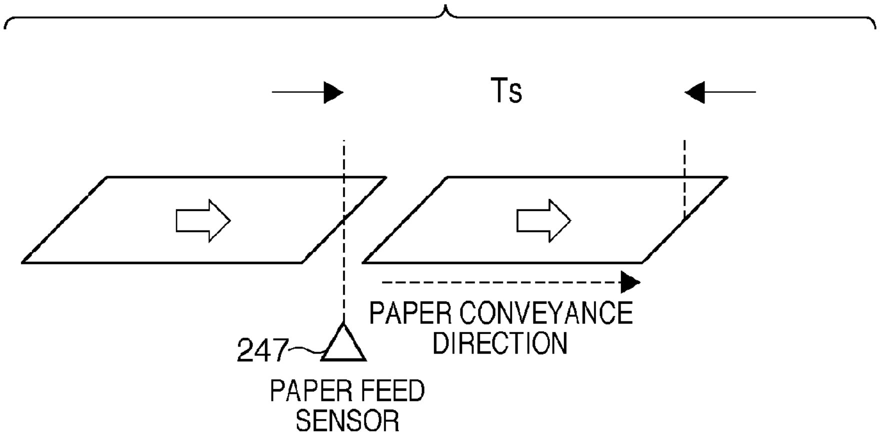
FIG. 11 is a view for explaining the time interval to be measured according to the second embodiment.

The second embodiment in the present invention will be described. Time measurement by each CPU in the second embodiment will be explained with reference to FIG. 11. As shown in FIG. 11, a paper feed sensor 247 is provided on a paper conveyance path for conveying paper in a direction indicated by an arrow. In the second embodiment, the time interval Ts until detection of the second paper after detection of the first paper by the paper feed sensor 247 is measured.

Figure 12:
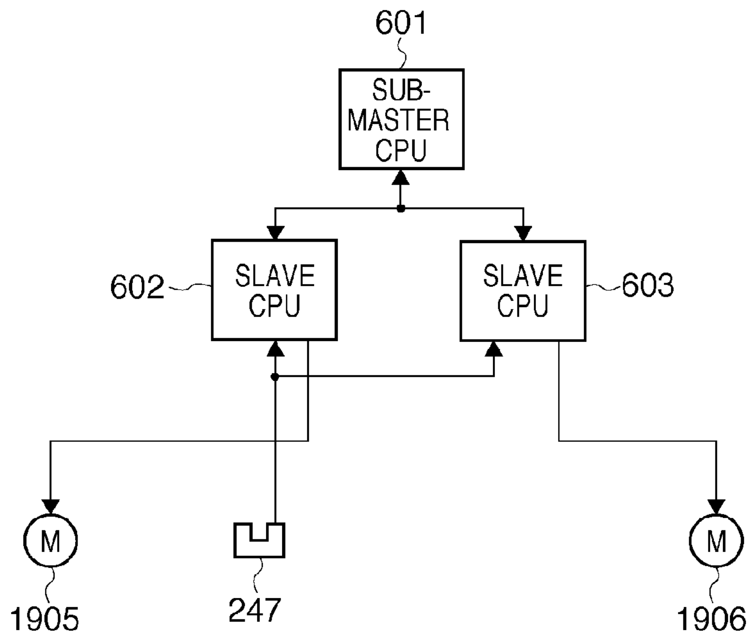
FIG. 12 is a diagram showing a control arrangement for correcting the time interval according to the second embodiment.

A detailed arrangement according to the second embodiment will be described with reference to FIG. 12. A sub-master CPU 601 communicates with slave CPUs 602 and 603. The connection method is arbitrarily parallel bus connection or serial bus connection. The slave CPU 602 controls the paper feed sensor 247 and an actuator 1905 such as a stepping motor. The slave CPU 603 controls an actuator 1906 such as a stepping motor. The paper feed sensor 247 outputs a signal to the slave CPUs 602 and 603. The use of clock oscillators incorporated in the slave CPUs 602 and 603 will be exemplified. However, the same arrangement is also applicable even when an external clock oscillator is used. The same arrangement is further applicable even when a master CPU replaces a sub-master CPU.

Figure 13:
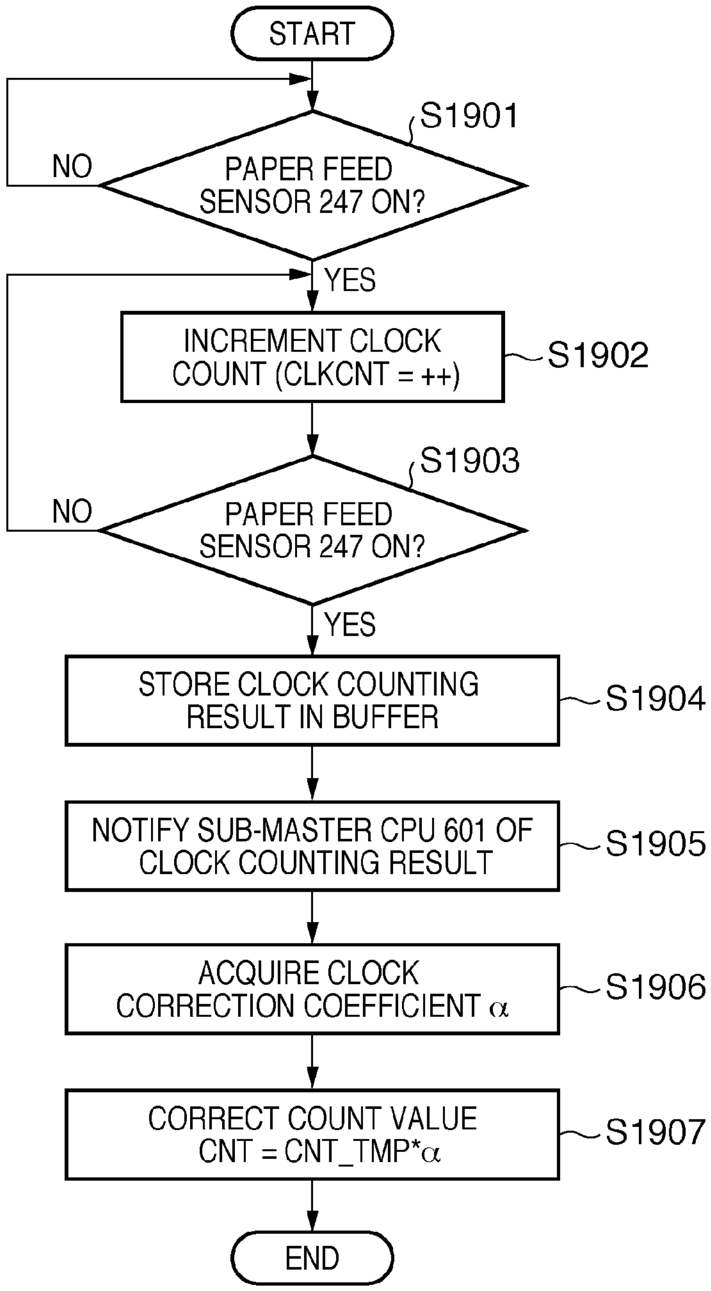
FIG. 13 is a flowchart showing a clock correction processing sequence according to the second embodiment.

Clock correction by the slave CPU 602 will be explained with reference to a flowchart shown in FIG. 13. In S1901, the slave CPU 602 determines whether paper has passed through the paper feed sensor 247. That is, the slave CPU 602 determines whether the paper feed sensor 247 has detected the leading edge of the paper. If the paper feed sensor 247 has detected the paper, the process advances to S1902; if NO, the determination in S1901 is periodically repeated.

In S1902, the slave CPU 602 counts clocks using, for example, a built-in clock oscillator. The clock count is incremented from an initial value "0". In S1903, the slave CPU 602 determines whether the next paper has passed through the paper feed sensor 247. If the paper feed sensor 247 has detected the next paper, the process advances to S1904; if NO, returns to S1902 to keep incrementing the clock count.

If the paper feed sensor 247 has detected the next paper, the slave CPU 602 stores the clock counting result in a memory such as an internal RAM in S1904. In S1905, the slave CPU 602 notifies the sub-master CPU 601 of the clock counting result stored in S1904. In S1906, the slave CPU 602 acquires a clock correction coefficient $\alpha$ calculated by the sub-master CPU 601. After acquiring the clock correction coefficient $\alpha$, the slave CPU 602 corrects, in S1907 based on the clock correction coefficient $\alpha$ acquired from the sub-master CPU 601, a timer count value used to control an actuator such as a stepping motor. More specifically, the slave CPU 602 calculates the timer count value using a linear equation "timer count value CNT=temporary count value CNT_TMP*clock correction coefficient $\alpha$", as shown in FIG. 13. The slave CPU 602 performs this correction processing for all timer count values obtained in image formation processing. The same processing as that of the flowchart shown in FIG. 13 is done even for clock correction by the slave CPU 603. Note that the method of calculating the clock correction coefficient $\alpha$ by the sub-master CPU 601 is the same as that in the first embodiment, and a description thereof will not be repeated.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-191471 filed on Aug. 20, 2009, and No. 2010-165347 filed on Jul. 22, 2010, which are hereby incorporated by reference herein in their entirety.

What is claimed is:

1. An image forming apparatus comprising:

an upper layer control unit that controls a function for forming an image on a printing material;

a first lower layer control unit and a second lower layer control unit that are controlled by said upper layer control unit and that control loads for implementing the function; and a sensor that outputs a detecting result to said first lower layer control unit and said second lower layer control unit, wherein said first lower layer control unit and said second lower layer control unit each include:

a clock oscillator;

a measurement unit that measures a time period of an interval determined by the detecting result by using said clock oscillator; and a notifying unit that notifies said upper layer control unit of the measured time period, wherein said first lower layer control unit further includes a correction unit that acquires a correction coefficient from said upper layer control unit, and corrects, based on the correction coefficient, a clock count value, and wherein said upper layer control unit includes a determining unit that (1) determines the correction coefficient for said first lower layer control unit to correct an error between said clock oscillators in said first lower layer control unit and said second lower layer control unit based on the measured time periods of said first lower layer control unit and said second lower layer control unit, and (2) transmits the determined correction coefficient to said first lower layer control unit.

2. The apparatus according to claim 1, wherein the correction coefficient is a correction coefficient for accommodating the measured time period of said first lower layer control unit to the time period of said second lower layer control unit.

3. The apparatus according to claim 1, wherein said determining unit (1) determines, using a predetermined time interval as a reference value, the correction coefficient for said first lower layer control unit and a correction coefficient for said second lower layer control unit, (2) transmits the determined correction coefficient for said first lower layer control to said first lower layer control unit, and (3) transmits the determined correction coefficient for said second lower layer control to said second lower layer control unit.

4. The apparatus according to claim 1, wherein said sensor includes a first sensor and second sensor that are provided along a printing material conveyance path and detect a printing material, wherein said second sensor is located downstream of said first sensor in a printing material conveyance path, and wherein said measurement unit measures the time period until said second sensor detects the printing material after said first sensor detects the printing material.

5. The apparatus according to claim 1, wherein said sensor is provided along a printing material conveyance path and detects a printing material, and wherein said measurement unit measures the time period until said sensor detects another printing material after said sensor detects a printing material.

6. The apparatus according to claim 1, wherein said first lower layer control unit drives the load when a clock count value of said clock oscillator coincides with the clock count value indicating the timing to drive the load.

* * * * *